United States Patent
Watson

(10) Patent No.: US 7,040,360 B2
(45) Date of Patent: May 9, 2006

(54) ANTI-SIPHON FUEL FILLER ASSEMBLY AND METHOD OF MANUFACTURING THE SAME

(76) Inventor: Kenneth A. Watson, 1100 NE. 126th St., Vancouver, WA (US) 98685

( * ) Notice: Subject to any disclaimer, the term of this patent is extended or adjusted under 35 U.S.C. 154(b) by 3 days.

(21) Appl. No.: 10/655,918

(22) Filed: Sep. 5, 2003

(65) Prior Publication Data

US 2005/0051236 A1   Mar. 10, 2005

(51) Int. Cl.
*B67C 3/26* (2006.01)

(52) U.S. Cl. ................................. 141/255; 220/86.3
(58) Field of Classification Search ............... 141/18, 141/98, 192, 198, 255, 323; 220/86.1, 86.2, 220/86.3

See application file for complete search history.

(56) References Cited

U.S. PATENT DOCUMENTS

| | | | | |
|---|---|---|---|---|
| 2,145,759 A | * | 1/1939 | Fellows et al. | 220/86.3 |
| 3,991,792 A | * | 11/1976 | Kettler | 138/108 |
| 4,630,748 A | * | 12/1986 | Keller | 220/86.3 |

* cited by examiner

*Primary Examiner*—Timothy L. Maust
(74) *Attorney, Agent, or Firm*—Ingrid McTaggart

(57) ABSTRACT

One embodiment of an anti-siphon fuel filler assembly includes a tube having a first end region adapted to be positioned in a fuel tank for allowing fuel to flow therethrough into said tank, the first end region including a first crimp and a second crimp, and a restriction structure positioned in the tube between the first crimp and the second crimp, the restriction structure including apertures sized for allowing fuel to flow therethrough while preventing the insertion of a siphon hose into the tank.

18 Claims, 1 Drawing Sheet

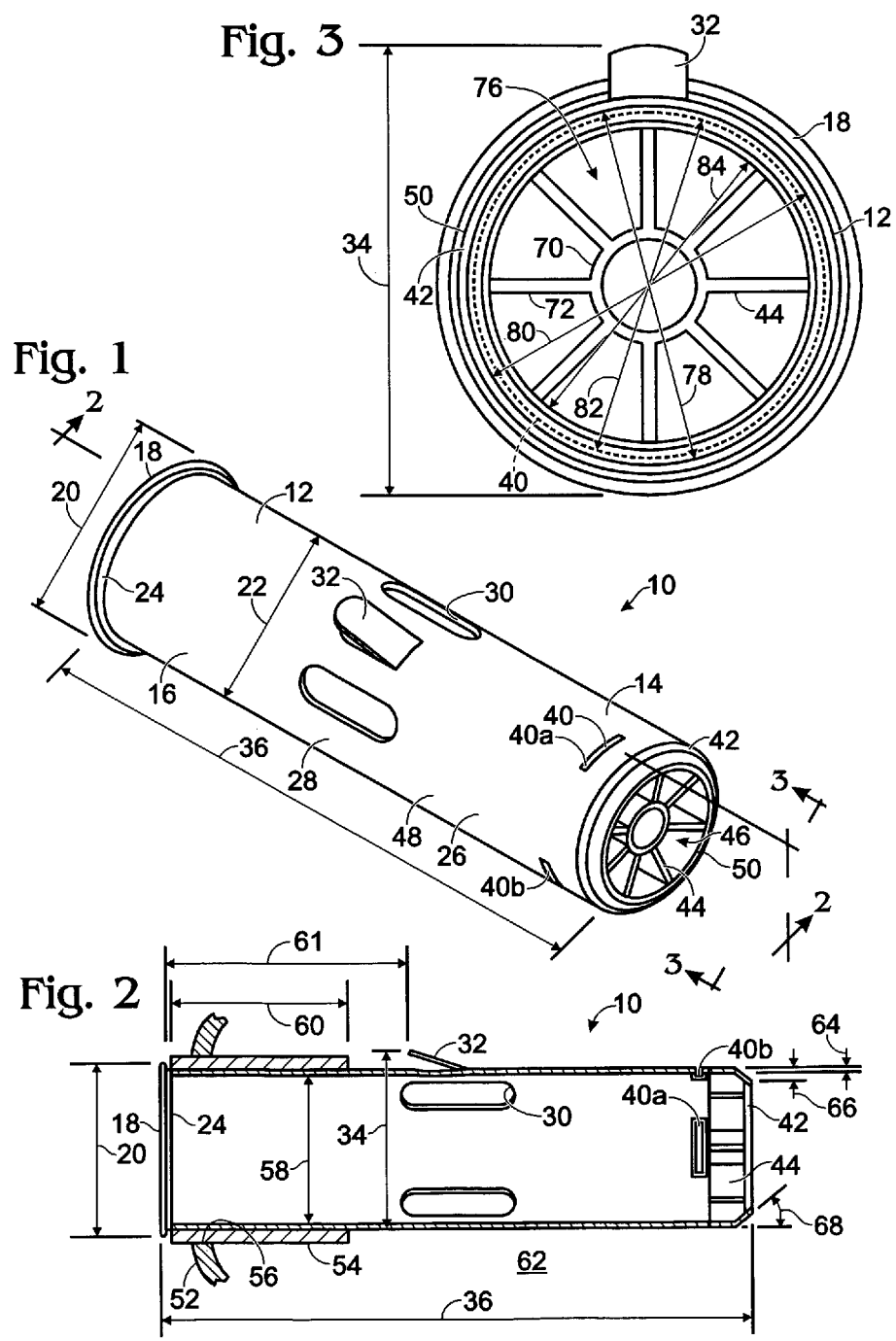

ANTI-SIPHON FUEL FILLER ASSEMBLY AND METHOD OF MANUFACTURING THE SAME

BACKGROUND OF THE INVENTION

The present invention is particularly intended for use on fuel tanks on commercial vehicles, although it may be used on any fuel tank connected to any type of engine. Fuel tanks typically include a filler tube inlet or opening through which fuel is filled into the fuel tank. On commercial vehicles the fuel tanks may be quite large. Due to high cost of fuel, these large fuel tanks may be susceptible to illegal siphoning of the fuel from the fuel tank.

Siphoning of fuel from a fuel tank generally involves placing a hose through the filler tube inlet or opening and down into the fuel held within the fuel tank. A suction pressure is then applied to the opposite end of the hose such that fuel within the tank flows upwardly and out of the tank through the hose. Siphoning generally cannot be accomplished if the hose cannot be placed downwardly into the tank and into the fuel held within the tank.

In order to prevent siphoning of fuel from fuel tanks, anti-siphon devices have been developed. One such antisiphon device is described in U.S. Pat. No. 4,630,748, entitled Anti-Siphon Fuel Filler Assembly, wherein a tube is inserted into the tank inlet opening. A lower end of the tube is completely compressed together across the tube's diameter and then welded to form a lower restriction in the tube. Holes are cut or stamped in the lower region of the tube thereby allowing fuel to pass therethrough during filling of the fuel tank. The welded end of the tube generally prevents a hose from being placed downwardly into the fuel tank.

The compressing and welding required for such prior art anti-siphon devices is labor intensive and requires certain manufacturing tools such as heavy duty compressing and welding machines. Accordingly, the prior art manufacturing process results in a device having a relatively large manufacturing cost.

There is a need, therefore, for an anti-siphon fuel filler assembly that can be manufactured without expensive compressing and welding equipment, and which can be manufactured with reduced labor intensive manufacturing steps.

SUMMARY OF THE INVENTION

One embodiment of an anti-siphon fuel filler assembly includes a tube having a first end region adapted to be positioned in a fuel tank for allowing fuel to flow therethrough into said tank, the first end region including a first crimp and a second crimp, and a restriction structure positioned in the tube between the first crimp and the second crimp, the restriction structure including apertures sized for allowing fuel to flow therethrough while preventing the insertion of a siphon hose into the tank.

BRIEF DESCRIPTION OF THE DRAWINGS

FIG. 1 is an isometric view of one embodiment of an anti-siphon fuel filler assembly of the present invention.

FIG. 2 is a cross-sectional side view of the anti-siphon fuel filler assembly taken along line 2—2 of FIG. 1, and shown installed on a fuel tank.

FIG. 3 is an end view of the anti-siphon fuel filler assembly taken along line 3—3 of FIG. 1.

DETAILED DESCRIPTION OF THE PREFERRED EMBODIMENTS

FIG. 1 is an isometric view of one embodiment of an anti-siphon fuel filler assembly of the present invention. Anti-siphon fuel filler assembly 10 in the embodiment shown comprises an elongate cylindrical body portion 12 including a first end region 14 and a second end region 16. First end region 14 is adapted to be received within a fuel filler tube or opening of a fuel tank (see FIG. 2) and second end region 16 is adapted to extend outwardly from or be positioned flush with a fuel tank opening (see FIG. 2). Second end region 16 may include a lip 18 or another type of outwardly extending projection so as to secure the tube against movement through the opening and into the fuel tank (see FIG. 2). Accordingly, lip 18 may have an outer diameter 20 that is greater than an outer diameter 22 of body portion 12 of assembly 10. An O-ring 24 may be placed around an exterior 26 of body 12 and adjacent lip 18 to provide a seal between lip 18 and the opening of a fuel tank (see FIG. 2) when the assembly is secured thereto.

Body 12, in a central region 28 thereof, may include a plurality of apertures 30 which may allow fluid and/or air to pass therethrough. Central region 28 may further include one or more retaining or deflection members, such as a tang 32, extending outwardly from body 12. Tang 32 generally extends outwardly from body 12 in an upper region of assembly 10, toward second region 16 of body 12, such that tang 32 acts to retain body 12 within a fuel tank once assembly 10 is inserted therein. In particular, tang 32 extends outwardly from body 12 to define a diameter 34 (see FIG. 2) that may be larger than the diameter of an opening (see FIG. 2) of a fuel tank such that assembly 10 is not easily removed from the opening in the direction through which the assembly was inserted. Accordingly, tang 32 and lip 18 together generally will retain assembly 10 in place on a fuel tank and against tampering or removal of the assembly from the fuel tank after installation thereof.

Body 12 of assembly 10, in the embodiment shown, is manufactured by the process of extrusion, such that body 12 may be seamless along its length 36. Lip 18, apertures 30 and tang 32 may be formed in body 12 after the extrusion process. Body 12 may be manufactured of aluminum but any durable material such as steel or heavy duty plastic may be utilized.

Still referring to FIG. 1, first end region 14 of body 12 may include a first crimp 40 and a second crimp 42 which may secure an anti-siphon insert 44 within an interior 46 of body 12. First crimp 40 may comprise a set of crimped regions, two of which, 40a and 40b, are visible in this figure, that may each extend at least partially around a perimeter 48 of body 12. In the embodiment shown, perimeter 48 defines a circumference of cylindrical body 12. First crimps 40a and 40b may be indented or inwardly protruding regions of body 12 that extend partially into interior 46 of body 12 such that crimped regions 40a and 40b define an inner diameter (see FIG. 3) that is smaller than an inner diameter (see FIG. 3) of body 12. In the embodiment shown, length 36 of body 12 may be in a range of approximately seven to twelve inches, and first crimps 40a and 40b may be positioned approximately ¾ of an inch from a lower end 50 of body 12. Crimps 40a and 40b may extend into interior 46 of body 12 approximately ¹⁄₁₆ of an inch. First crimp 40, including 40a and 40b, may be added to body 12 after extrusion of body 12. Projection of first crimp 40 into interior 46 of body 12 only through a potion of interior 46, such as only $\frac{1}{16}$ of an *inch*, generally requires less compression force than completely compressing body 12 across its *diameter*. *Accordingly*, the crimping process of the present invention requires reduced sized crimping machinery than the heavy duty compressing machinery of prior art *devices*. *Accordingly*, the present invention has reduced manufacturing costs when compared to prior art *anti-siphon assemblies*.

Second crimp 42 may comprise a crimped region that extends completely around perimeter 48 at lower end 50 of body 12. Second crimp 42 may be manufactured on body 12 after extrusion thereof. Second crimped region 42 may be an indentation or an inwardly protruding region of body 12 that defines an inner diameter (see FIG. 3) that is smaller than an inner diameter (see FIG. 3) of body 12. Second crimp 42 may extend into interior 46 of body 12 approximately ⅛ of an inch and may define an angle (see FIG. 2) of approximately 45 degrees with respect to length 36 of body 12. Accordingly, crimps 40 and 42 may retain insert 44 within interior 46 and between the first and second crimped regions 40 and 42.

FIG. 2 is a cross-sectional side view of the anti-siphon fuel filler assembly 10 taken along line 2—2 of FIG. 1, and shown installed on a fuel tank 52. In particular, assembly 10 may be installed within a filler tube 54 that is installed in an opening 56 of fuel tank 52. Filler tube 54 may be secured within opening 56 by any means, such as by welding, such that filler tube 54 generally is fixedly secured within opening 56. Outer diameter 22 of anti-siphon assembly 10 may be only slightly smaller than an inner diameter 58 of filler tube 54 such that assembly 10 fits snugly therein. Filler tube 54 may have a length 60 that extends into an interior 62 of fuel tank 52 less than length 36 of anti-siphon assembly 10. Moreover, length 60 of filler tube 54 is generally less than a length 61 of a portion of body 12 that extends from lip 18 to tang 32. Accordingly, when assembly 10 is positioned within filler tube 54, tangs 32 may be memory biased to extend outwardly into interior 62 of fuel tank 52 such that outer diameter 34 of tangs 32 is greater than inner diameter 58 of filler tube 54 thereby retaining anti-siphon assembly 10 in place within filler tube 54.

Still referring to FIG. 2, first crimp 40 is shown extending inwardly into interior 46 of body 12 a distance 64 of approximately *frax*;1;16 *inch*. C*rimp* 42 is shown extending inwardly into interior 46 of body 12 a distance 66 of approximately ⅛ inch and defining an angle 68 of approximately *forty-five degrees*. I*n other embodiments*, crimps 40 *and/or* 42 may extend into interior 46 any distance less than the radius or midway point of a cross section of interior 46 such that crimps 40 *and/or* 42 do not meet one *another*. I*n other words*, crimps 40 *and/or* 42 do not completely close off interior 46 of body 12 of assembly 10 but merely act as projections to secure an *anti-siphon* insert 44 *therein*.

FIG. 3 is an end view of the anti-siphon fuel filler assembly 10 taken along line 3—3 of FIG. 1. Tang 32 and lip 18 are shown extending outwardly from body 12. End 50 of body 12 is shown having second crimp 42 therein. Anti-siphon insert 44 is shown secured within interior 46 of body 12 between crimps 40 and 42. Insert 44 may have a cross sectional shape which may be described as a snowflake or a hub-and-spoke arrangement. The hub-and-spoke shape of insert 44 may include a central hub 70 having a plurality of spokes 72 extending outwardly therefrom. Central hub 70 may define an aperture 74 positioned therein and spokes 72 may define a plurality of apertures 76 positioned therebetween. Apertures or openings 74 and 76 may sized so as to allow fuel and air to easily flow through insert 44, but may be sized so as to prevent insertion of a siphon hose therethrough and into interior 62 of fuel tank 52. The cylindrically symmetrical shape of insert 44 may add strength and stability to insert 44 such that insert 44 may not be easily broken or damaged by a vandal attempting to force a hose into tank 52 or a pry bar into filler assembly 10 to remove the insert therefrom. Of course, other shapes and designs of insert 44 may be utilized in other embodiments of the present invention. Insert 44 may be manufactured of aluminum but any durable material such as steel or heavy duty plastic may be utilized.

Insert 44 typically may have a structure that is symmetrical about a central point of the insert, such as the snowflake or hub-and-spoke shape as shown, such that the insert may be easily manufactured by the process of extrusion. In particular, insert 44 may be extruded as a single, long piece of material and then cut across its cross-section and along its length to define individual inserts 44. Insert 44 generally will have an outer diameter 78 that that is slightly smaller than the inner diameter 80 of body 12 such that insert 44 is snugly received therein. Moreover, the outer diameter 78 of insert 44 generally will be larger than the inner diameter 82 of body 12 at first crimp 40 and the inner diameter 84 of body 12 at second crimp 42. Accordingly, insert 44 may retained within body 12 between crimps 40 and 42 such that the method of the present invention may include: providing body 12, creating a first crimp, placing an insert 44 within body 12, then creating a second crimp opposite the first insert to secure insert 44 within body 12 and between the two crimps. This extrusion and cutting process of insert 44, and the process of placing the insert within body 12 between the creation of crimps 40 and 42, may result in an anti-siphon device 10 that is relatively inexpensive to manufacture and assemble yet which provides high strength and reliability.

In the above description numerous details have been set forth in order to provide a more through understanding of the present invention. It will be obvious, however, to one skilled in the art that the present invention may be practiced using other equivalent designs.

We claim:

1. An anti-siphon fuel filler assembly for placement in a fuel tank, comprising:
    a tube including a first end region adapted to be positioned in said fuel tank for allowing fuel to flow therethrough into said tank, said first end region including a first crimp and a second crimp; and
    a restriction structure positioned in said tube between said first crimp and said second crimp, said restriction structure including apertures sized for allowing fuel to flow therethrough while preventing the insertion of a siphon hose into said tank,
    wherein said restriction structure comprises a hub and a plurality of spokes extending outwardly therefrom.

2. An anti-siphon assembly according to claim 1 wherein said restriction structure is manufactured by the process of extrusion.

3. An anti-siphon assembly according to claim 1 wherein tube further comprises deflection structure for retaining said tube in said tank.

4. An anti-siphon assembly according to claim 1 wherein said first crimp includes a plurality of crimped regions positioned around a perimeter of said first end region of said tube.

5. An anti-siphon assembly according to claim 1 wherein said second crimp includes a crimped region that extends completely around a perimeter of an end of said first end region of said tube.

6. An anti-siphon assembly according to claim 1 wherein said tube and said restriction structure are manufactured of aluminum.

7. An anti-siphon assembly according to claim 1 wherein said first and second crimps each define a deflection that extends into an interior of said tube.

8. An anti-siphon assembly according to claim 1 wherein said hub defines an opening therein and wherein said plurality of spokes each define a opening therebetween so as to allow the flow of fuel therethrough.

9. An anti-siphon assembly according to claim 1 wherein said tube defines a tube inner diameter, said first crimp defines a first crimp inner diameter, said restriction structure defines a restriction structure outside diameter, and wherein said restriction structure outside diameter is greater than said first and second crimp inner diameters and is smaller than said tube inner diameter.

10. A fuel tank, comprising:
 a tank including an opening for receiving fuel therethrough; and
 a filler tube insert positioned in said tank opening, said filler tube insert including a first end region received within said tank and having an anti-siphon insert crimped within said first end region, said anti-siphon insert including a plurality of apertures for allowing fuel flow therethrough,
 wherein said filler tube insert further comprises deflection structure for retaining said filler tube insert in said tank.

11. A fuel tank according to claim 10 further comprising a filler tube mount on said opening wherein said filler tube insert is positioned within said filler tube.

12. A fuel tank according to claim 10 wherein said filler tube insert has a cylindrically symmetrical cross sectional shape that defines said plurality of apertures.

13. A fuel tank according to claim 10 wherein said filler tube first end region includes a first crimped region a second crimped region, and said anti-siphon insert is crimped within said filler tube insert between said first and second crimped regions.

14. A fuel tank according to claim 10 wherein said anti-siphon insert is secured within said filler tube insert in the absence of welds.

15. An anti-siphon fuel filler insert for placement in a filler neck tube of a fuel tank comprising:
 tube means including a first end region adapted to be positioned in said fuel tank for allowing fuel to flow therethrough into said tank; and
 restriction means positioned in said tube and having a central region and a plurality of arms extending cylindrically, symmetrically outwardly therefrom, said arms defining apertures therebetween for the flow of fuel therethrough,
 wherein said restriction means is secured within said tube means exclusively by indentations in said tube means.

16. A anti-siphon insert according to claim 15 wherein said restriction means is manufactured by the process of extrusion.

17. An anti-siphon insert according to claim 15 wherein said indentations extend only partially into an interior of said tube means.

18. A fuel tank, comprising:
 a tank including an opening for receiving fuel therethrough; and
 a filler tube insert positioned in said tank opening, said filler tube insert including an anti-siphon insert having a plurality of apertures defined by arms extending cylindrically outwardly from a central hub,
 wherein said filler tube insert and anti-siphon insert are manufactured of aluminum.

* * * * *